(12) United States Patent
Jiang et al.

(10) Patent No.: US 11,336,730 B1
(45) Date of Patent: May 17, 2022

(54) MQTT-BASED DISTRIBUTION INTERNET OF THINGS SYSTEM AND METHOD THEREOF

(71) Applicant: Zhejiang Gongshang University, Hangzhou (CN)

(72) Inventors: Xiaoning Jiang, Hangzhou (CN); Yang Ma, Hangzhou (CN); Kelei Jiang, Hangzhou (CN); Fengqing Zhang, Hangzhou (CN); Xuyi Chen, Hangzhou (CN); Jiang Li, Hangzhou (CN); Zhendong Yu, Hangzhou (CN)

(73) Assignee: Zhejiang Gongshang University, Hangzhou (CN)

( * ) Notice: Subject to any disclaimer, the term of this patent is extended or adjusted under 35 U.S.C. 154(b) by 0 days.

(21) Appl. No.: 17/196,356

(22) Filed: Mar. 9, 2021

(30) Foreign Application Priority Data

Nov. 13, 2020 (CN) .......................... 202011268786.7

(51) Int. Cl.
*H04L 29/08* (2006.01)
*H04L 67/12* (2022.01)
*G16Y 30/00* (2020.01)
*G16Y 40/30* (2020.01)

(52) U.S. Cl.
CPC .............. *H04L 67/12* (2013.01); *G16Y 30/00* (2020.01); *G16Y 40/30* (2020.01)

(58) Field of Classification Search
CPC .......... H04L 67/12; G16Y 40/30; G16Y 30/00
See application file for complete search history.

(56) References Cited

U.S. PATENT DOCUMENTS 10,313,221 B1 * 6/2019 Leonard .............. H04L 41/5009

FOREIGN PATENT DOCUMENTS

| CN | 106643888 A | * | 5/2017 |
| CN | 110417837 A | * | 11/2019 |
| CN | 112199210 A | * | 9/2020 |

* cited by examiner

*Primary Examiner* — Zhensheng Zhang
(74) *Attorney, Agent, or Firm* — Schwegman Lundberg & Woessner, P.A.

(57) ABSTRACT

The disclosure provides an MQTT-based distribution Internet of Things system and a method thereof. The system includes: a sensing ring including a plurality of data acquisition and monitoring devices and a sensing control module provided in a distribution network; an application ring including a plurality of application servers and an application control module; a communication ring including at least one communication module, each communication module being connected with the application control module and a corresponding sensing control module respectively. The application ring is configured to issue an application request, so that the sensing ring controls a distribution device in the distribution network according to the application request and acquires device data of the distribution device, and the sensing ring feeds the device data back to the application ring; and/or the sensing ring is configured to sense and acquire the device data of the distribution device, and send the device data to the application ring, so that the application ring performs data management, data processing, data analysis, data monitoring and data pre-warning on the device data. The method has a beneficial effect that the constructed distribution Internet of Things system is simpler.

14 Claims, 3 Drawing Sheets

MQTT-BASED DISTRIBUTION INTERNET OF THINGS SYSTEM AND METHOD THEREOF

TECHNICAL FIELD

The disclosure relates to the technical field of Internet of Things, in particular to an MQTT-based distribution Internet of Things system and a method thereof.

BACKGROUND ART

A technology convergence of a smart grid and an Internet of Things facilitates building a new generation of power grid which is reliable, stable, economical, efficient, standardized, interactive and friendly, and improves an intelligent level of all application links of the power grid. A cloud computing, as a virtual resource pool, can provide a powerful, low-cost, dynamically scalable cloud platform for monitoring a state of a computing and distribution device for smart grid oriented IoT applications, which favors computing and mining of massive data, with characteristics of energy saving, environmental protection, high reliability, high availability and high security.

However, architectures of the existing distribution Internet of Things are usually of a four-tier structure of "Cloud, Tube, Edge and Terminal". The "Cloud" is a cloud main station platform, the "Tube" is a data transmission channel between the "Terminal" and the "Cloud", the "Edge" is a distributed intelligent agent near a thing or data source and at an edge of the network, and "Terminal" is a main terminal unit for state sensing and control execution in the distribution Internet of Things architecture. However, the distribution Internet of Things in the prior art is complex in structure with an unspecific concept, which is not favorable for design, implementation and maintenance.

SUMMARY

In view of above problems in the prior art, an MQTT-based distribution Internet of Things system and a method thereof are provided.

The specific technical scheme is as follows:

An MQTT-based distribution Internet of Things system includes at least one sensing ring, an application ring and a communication ring.

The at least one sensing ring includes a plurality of data acquisition and monitoring devices and a sensing control module provided in a distribution network. Each data acquisition and monitoring device is connected with the sensing control module.

The application ring includes a plurality of application servers and an application control module. Each application server is connected with the application control module.

The communication ring includes at least one communication module. Each communication module is connected with the application control module and a corresponding sensing control module respectively.

The application ring is configured to issue an application request, so that the sensing ring controls a distribution device in the distribution network according to the application request and acquires device data of the distribution device, and the sensing ring feeds the device data back to the application ring, so that the application ring performs data management, data processing, data analysis, data monitoring and data pre-warning on the device data; and/or the sensing ring is configured to sense and acquire the device data of the distribution device, and send the device data to the application ring, so that the application ring performs data management, data processing, data analysis, data monitoring and data pre-warning on the device data.

The device data includes operating status data and/or environmental data.

Preferably, in the MQTT-based distribution Internet of Things system, the application control module is provided with a first access interface for accessing the communication module and the sensing ring connected with the communication module; and/or the communication module is provided with a second access interface for accessing the sensing ring.

Preferably, in the MQTT-based distribution Internet of Things system, the distribution network comprises a plurality of distribution device.

The data acquisition and monitoring device is connected with a corresponding distribution device.

The data acquisition and monitoring device includes a control unit, a sensing acquisition unit and a sensing sending unit.

The control unit is configured to control the distribution device according to the application request.

The sensing acquisition unit is configured to sense and acquire the device data of the distribution device.

The sensing sending unit is configured to send the device data to the sensing control module.

Preferably, in the MQTT-based distribution Internet of Things system, the application server includes:

a first processing unit configured to process the received operation state data to obtain normal operation data and/or abnormal operation state; and/or a second processing unit configured to process the received operation state data, and monitor and pre-warn a processing result; and/or a third processing unit configured to process the received operation state data and environmental data, and monitor and pre-warn a processing result.

Preferably, in the MQTT-based distribution Internet of Things system, the communication module, the application control module and the sensing control module adopt a message queuing telemetry transport protocol.

Preferably, in the MQTT-based distribution Internet of Things system, the application control module and the sensing control module both adopt an MQTT Bridge component.

The MQTT Bridge component includes any one of a Mosquitto, an Apache-Apollo and an EMQ.

Preferably, in the MQTT-based distribution Internet of Things system, the application control module and the sensing control module both adopt an EMQ.

Preferably, in the MQTT-based distribution Internet of Things system, the communication module adopts a bridge.

A management method of an MQTT-based distribution Internet of Things applied to any of the above MQTT-based distribution Internet of Things system is provided. Specifically, the method includes the following.

An application server issues an application request to an application control module; the application control module sends the application request to a sensing control module in a corresponding sensing ring through a communication module; a corresponding data acquisition and monitoring device acquires the application request from the sensing control module; the corresponding data acquisition and monitoring device controls and acquires device data in the distribution network according to request information in the application request; and the corresponding data acquisition and monitoring device sends the acquired device data to the application server through the sensing control module, the communication module and the application control module successively, so that the application server performs data management, data processing, data analysis, data monitoring and data pre-warning on the device data.

A management method of an MQTT-based distribution Internet of Things applied to any of the above MQTT-based distribution Internet of Things system is provided. Specifically, the method includes the following.

A data acquisition and monitoring device sends sensed and acquired device data of a distribution device to a sensing control module; the sensing control module sends the device data to an application control module through a communication module; and the application control module sends the device data to a corresponding application server, so that the application server perform corresponding data management and/or data processing and/or data analysis and/or data monitoring and/or data pre-warning on the device data.

The above technical scheme has following advantages or beneficial effects as follows.

The distribution Internet of Things system with a general 3C3C (3 circles and 3 components) model is constructed with the sensing ring, the application ring and the communication ring, thus simplifying the existing distribution Internet of Things system with a four-tier architecture and making the constructed distribution Internet of Things system simpler, which facilitates customers to develop and upgrade the distribution Internet of Things system.

BRIEF DESCRIPTION OF THE DRAWINGS

Embodiments of the present disclosure will be described more fully with reference to the accompanying drawings. However, the attached drawings are intended for illustration and illustration only, and do not constructed as a limitation on a scope of the present disclosure.

DETAILED DESCRIPTION

In the following, the technical scheme in the embodiment of the disclosure will be described clearly and completely in connection with the drawings; obviously, the described embodiment is intended to be only a part of the embodiment of the disclosure, but not all of them. On a basis of embodiments in this disclosure, all other embodiments obtained by the ordinary skilled in the art without any creative effort are within the protection scope of this disclosure.

It should be noted that the embodiments in the present disclosure and the characteristics in the embodiments can be combined mutually in the case of no conflict.

The present disclosure will be further explained with reference to the attached drawings and specific embodiments, but not as a limitation of the present disclosure.

Figure 1:
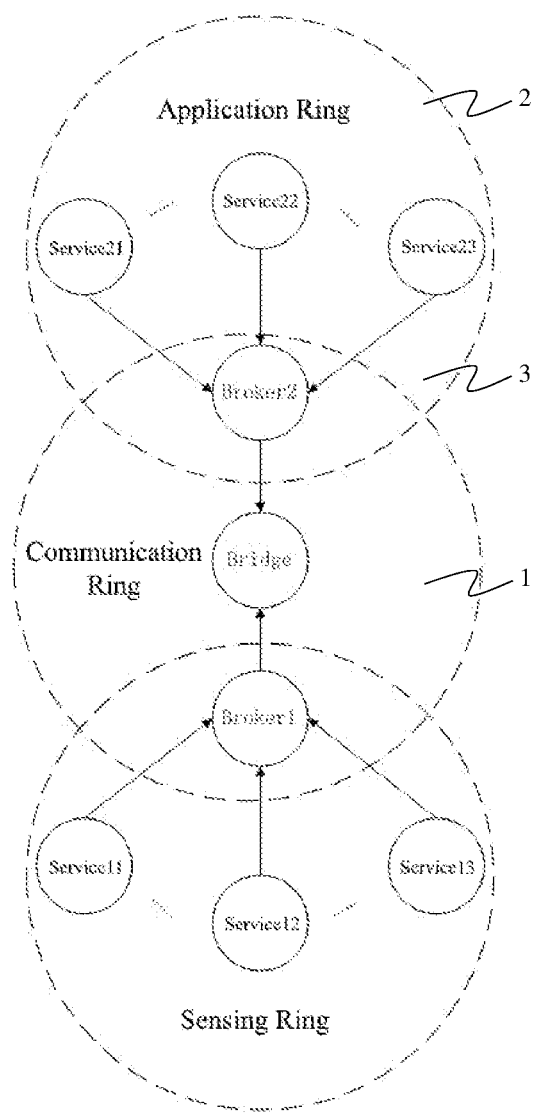
FIG. 1 is a structural diagram of an embodiment of an MQTT-based distribution Internet of Things system with a single sensing ring according to the present disclosure.
Figure 2:
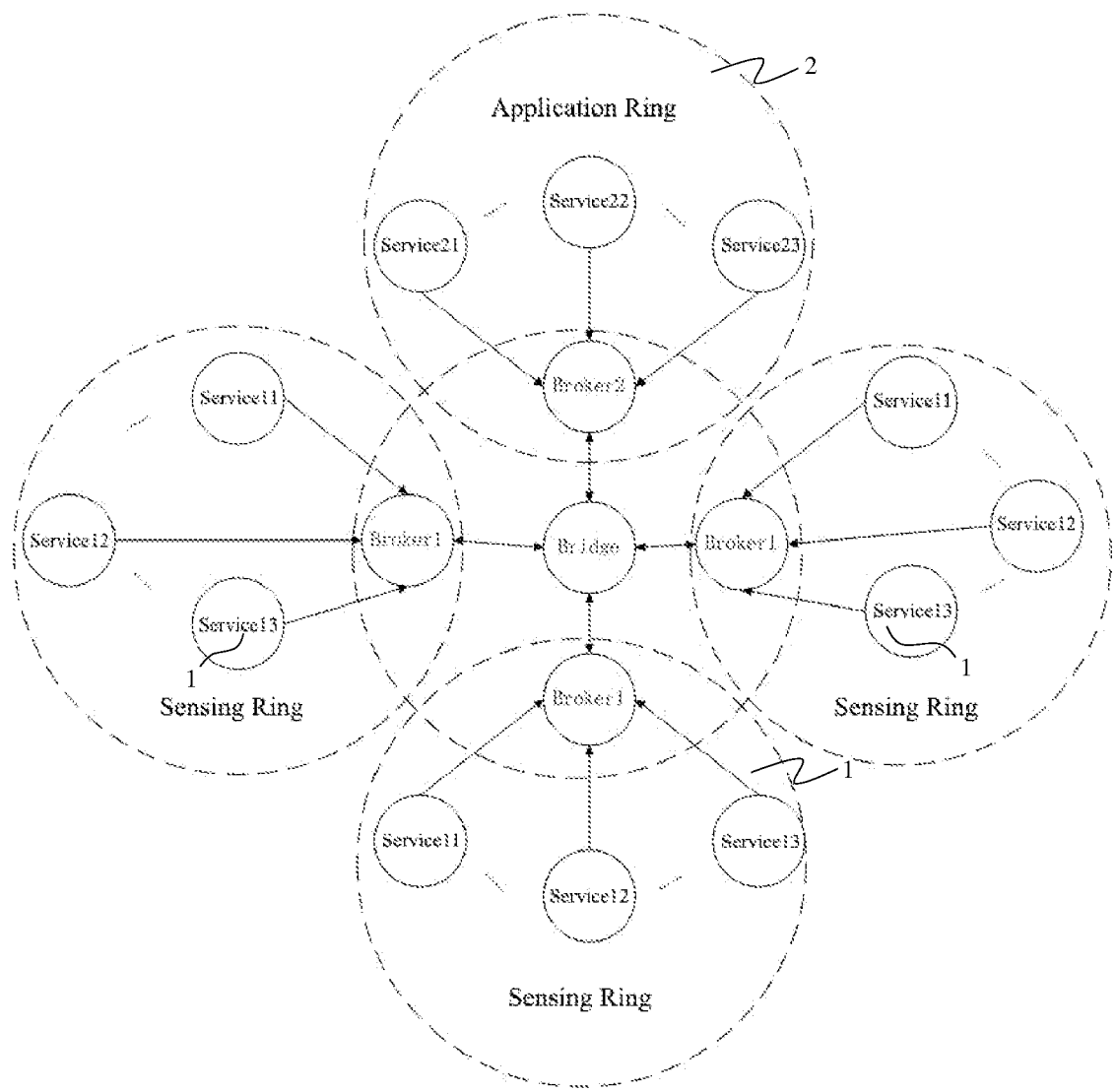
FIG. 2 is a structural diagram of an embodiment of an MQTT-based distribution Internet of Things system with a plurality of sensing rings according to the present disclosure.

The disclosure includes an MQTT-based distribution Internet of Things system, which, as shown in FIGS. 1 to 2, includes at least one sensing ring 1, an application ring 2 and a communication ring 3.

The at least one sensing ring 1 includes a plurality of data acquisition and monitoring devices Service1 (Service11, Service12, Service13, . . . ) and a sensing control module Broker1 provided in a distribution network. Each data acquisition and monitoring device Service1 is connected with the sensing control module Broker1.

The application ring 2 includes a plurality of application servers Service2 (Service21, Service22, Service23, . . . ) and an application control module Broker2. Each application server Service2 is connected with the application control module Broker2.

The communication ring 3 includes at least one communication module Bridge. Each communication module Bridge is connected with the application control module Broker2 and a corresponding sensing control module Broker1 respectively.

The application ring 2 is configured to issue an application request, so that the sensing ring 1 controls a distribution device in the distribution network according to the application request and acquires device data of the distribution device, and the sensing ring 1 feeds the device data back to the application ring 2, so that the application ring 2 performs data management, data processing, data analysis, data monitoring and data pre-warning on the device data; and/or the sensing ring 1 is configured to sense and acquire the device data of the distribution device, and send the device data to the application ring 2, so that the application ring 2 performs data management, data processing, data analysis, data monitoring and data pre-warning on the device data.

The device data includes operating status data and/or environmental data.

In the above embodiment, the distribution Internet of Things system with a general 3C3C (3 circles and 3 components) model is constructed with the sensing ring 1, the application ring 2 and the communication ring 3, thus simplifying the existing distribution Internet of Things system with a four-tier architecture and making the constructed distribution Internet of Things system simpler, which facilitates customers to develop and upgrade the distribution Internet of Things system.

In the above embodiments, the sensing ring 1 is a "nerve ending" of a ubiquitous distribution Internet of Things system. Its important function is to use various types of data acquisition and monitoring devices Service1 to comprehensively sense different distribution devices. The data acquisition and monitoring devices Service1 separately includes a distributed power supply, a distribution transformer (public transformer and dedicated transformer), a switch station, a ring main unit, a voltage and current transformer in a primary system of a power grid, an electric energy meter and a concentrator in a secondary system of the power grid, and various user-side intelligent appliances. With the device data acquired by an ubiquitous sensing, the sensing control module Broker1 can get the operation state data and/or environmental data of each distribution device in each link of the distribution network from both breadth and depth, so that when the distribution network is faced with intermittent new energy grid connection, random load switching and electric vehicle space-time clustering or other affects, the system state can be mastered in real time, hidden fault dangers can be found in time, risks of safe operations can be evaluated. Meanwhile, by flexibly adjusting a topology of the power grid, a power supply output is controlled in real time, a user energy utilization mode is optimized, thus improving a capacity of the power grid for receiving high-proportion distributed new energy and new loads, and strengthening an accident tolerance of the power grid to sudden faults.

In the above embodiment, the application ring 2 is located at a top of the distribution Internet of Things system, and is an external manifestation of the distribution Internet of Things system transforming towards a centralized, platform-based and shared one. The application ring 2 includes a plurality of application servers Service2, and all the application servers Service2 build various targeted application service platforms to realize interactions between the distribution Internet of Things system and users or other energy systems.

In the above embodiment, the application servers Service2 in the application ring 2 can directly exchange information with others; and similarly, the application servers Service2 in the sensing ring 1 can directly exchange information with others, thereby reducing communication overhead of the system, reducing delay and further reducing complexity of the distribution Internet of Things system.

Figure 3:
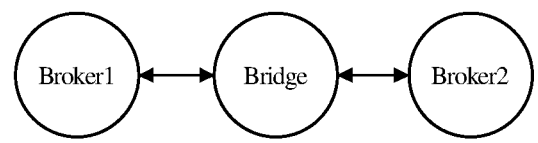
FIG. 3 is a schematic diagram showing a connection between a sensing control module Broker1 and an application control module Broker2 through a communication module Bridge in an embodiment of the MQTT-based distribution Internet of Things system according to the present disclosure.

Further, as a preferred embodiment, as shown in FIG. 3, the application control module Broker2 is provided with a first access interface for accessing the communication module Bridge and the sensing ring 1 connected with the communication module Bridge.

In the above preferred embodiment, the communication module Bridge and at the least one sensing ring 1 may be connected to the first access interface, so that a newly accessed sensing ring 1 communicates with the application ring 2 through a newly accessed communication module Bridge. Therefore, when user needs to join other sensing ring 1, the distribution Internet of Things system is not required to be rebuilt, but only required to connect the new sensing ring 1 with the application ring 2.

Figure 4:
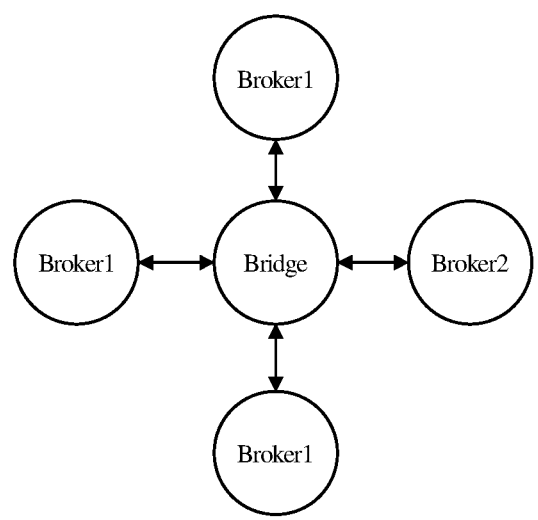
FIG. 4 is another schematic diagram showing a connection between a sensing control module Broker1 and an application control module Broker2 through a communication module Bridge in an embodiment of the MQTT-based distribution Internet of Things system according to the present disclosure.

Further, as a preferred embodiment, as shown in FIG. 4, the communication module Bridge is provided with a second access interface for accessing the sensing ring 1.

In the above preferred embodiment, the at least one sensing ring 1 may be connected to the second access interface, so that a newly accessed sensing ring 1 communicates with the application ring 2 through the original communication module Bridge. Therefore, when user needs to join other sensing ring 1, the distribution Internet of Things system is not required to be rebuilt, but only required to connect the new sensing ring 1 with the application ring 2 through the original communication module Bridge.

Further, in the above embodiment, the distribution network includes a plurality of distribution devices.

The data acquisition and monitoring devices Service1 are connected with a corresponding distribution device.

The data acquisition and monitoring devices Service1 separately includes a control unit, a sensing acquisition unit and a sensing sending unit.

The control unit is configured to control the distribution device according to the application request.

The sensing acquisition unit is configured to sense and acquire the device data of the distribution device.

The sensing sending unit is configured to send the device data to the sensing control module Broker1.

In the above embodiment, the data acquisition and monitoring devices Service11, 12, 13 may separately include the control unit, the sensing acquisition unit and the sensing sending unit, so that the data acquisition and monitoring devices Service11, 12, 13 can control the sensing acquisition unit to sense and acquire the device data of distribution device according to the application request issued by the application ring 2, and cause the sensing sending unit to send the device data to the sensing control module Broker1.

Further, in the above embodiment,

The application servers Service2 separately includes:

a first processing unit configured to process the received operation state data to obtain normal operation data and/or abnormal operation state.

As a first preferred embodiment, when the distribution network includes an electric vehicle charging station, the distribution devices in the distribution network may include a charger, an emergency charger, a battery maintenance device and a quick replacing device.

The sensing ring 1 includes a data acquisition and monitoring device Service11, 12, 13, . . . corresponding to each of the above distribution devices, namely, a data acquisition and monitoring device Service11 corresponding to the charger, a data acquisition and monitoring device Service12 corresponding to the emergency charger, a data acquisition and monitoring device Service13 corresponding to the battery maintenance device and a data acquisition and monitoring device Service14 corresponding to the quick replacing device.

Firstly, the data acquisition and monitoring device Service1 in the sensing ring 1 can sense and acquire the device data of each of the distribution devices in the electric vehicle charging station. The device data includes charging records, charging time, price, total amount, remaining power, accumulated power and other information.

Secondly, the data acquisition and monitoring devices Service1 upload the acquired device data to the sensing control module Broker1.

Then, the sensing control module Broker1 uploads the device data to the application control module Broker2 in the application ring 2 through the bridge, and the application control module Broker2 sends the device data to a corresponding application servers Service2, so that the application servers Service2 perform a corresponding data management and/or data processing and/or data analysis and/or data monitoring and/or data pre-warning on the device data, so as to realize charging transaction log querying, marketing data analyzing, accumulated power reading, charging post state detecting and other applications.

Further, in the above embodiment, the application servers Service2 separately includes:

a second processing unit configured to process the received operation state data, and monitor and pre-warn a processing result.

As a second preferred embodiment, when the distribution network includes an intelligent substation, the distribution devices in the distribution network may include a transformer, a circuit breaker, a lightning arrester and an infrared detector.

The sensing ring 1 includes a data acquisition and monitoring device Service1 corresponding to each of the distribution devices, namely, a data acquisition and monitoring device Service1 corresponding to the transformer, a data acquisition and monitoring device Service1 corresponding to the circuit breaker, a data acquisition and monitoring device Service1 corresponding to the lightning arrester and a data acquisition and monitoring device Service1 corresponding to the infrared detector.

Firstly, the data acquisition and monitoring device Service1 in the sensing ring 1 can sense and acquire device data of each of the distribution devices in the intelligent substation. The device data includes operation state data of each of the distribution devices in the intelligent substation and environmental data of a special distribution device.

Secondly, the data acquisition and monitoring devices Service1 upload the acquired device data to the sensing control module Broker1.

Then, the sensing control module Broker1 uploads the device data to the application control module Broker2 in the application ring 2 through the bridge, and the application control module Broker2 sends the device data to a corresponding application server Service2.

The first application server Service2 processes the received operation state data of the transformer to obtain the normal operation data and/or the abnormal operation state, thus providing a data support for a state maintenance of the transformer.

The second application server Service2 processes the received operation state data of the circuit breaker to obtain the normal operation data and/or the abnormal operation state, thus providing a data support for a state maintenance of the circuit breaker.

The third application server Service2 processes the received operation state data of the lightning arrester to obtain a processing result, and judges whether to perform a pre-warning for the processing result according to standard data of the lightning arrester, so as to send out a pre-warning signal against a potential abnormal operation of the lightning arrester.

The operation state data of the lightning arrester includes a total current, a harmonic current and a resistive current and others.

The fourth application server Service2 processes the received operation state data of the infrared detector to obtain a processing result, and sets a safety area, a warning area and a dangerous area according to the environmental data, and performs a pre-warning for the warning area and the dangerous area, thus present a safety prompt for regional operators and an effective warning against an intrusion, and realizing an intelligent monitoring of safety guards.

Further, in the above embodiment, the application servers Service2 separately includes:

a third processing unit configured to process the received operation state data and environmental data, and monitor and pre-warn a processing result.

As a third preferred embodiment, when the distribution network includes a photovoltaic power station, the distribution devices in the distribution network may include a solar cell, a DC distribution cabinet, a transformer, a grid-connected inverter, an environmental detection device, etc.

The sensing ring 1 includes a data acquisition and monitoring device Service1 corresponding to each of the above-mentioned distribution devices, namely, a data acquisition and monitoring device Service1 corresponding to the solar cell, a data acquisition and monitoring device Service1 corresponding to the DC distribution cabinet, a data acquisition and monitoring device Service1 corresponding to the transformer, a data acquisition and monitoring device Service1 corresponding to the grid-connected inverter and a data acquisition and monitoring device Service1 corresponding to the environmental detection device.

Firstly, the data acquisition and monitoring device Service1 in the sensing ring 1 can sense and acquire the device data of each of the distribution devices in the photovoltaic power station.

Secondly, the data acquisition and monitoring devices Service1 upload the acquired device data to the sensing control module Broker1.

Then, the sensing control module Broker1 uploads the device data to the application control module Broker2 in the application ring 2 through the bridge, and the application control module Broker2 sends the device data to a corresponding application server Service2 so that the application servers Service2 can analyze power information and operation states in an energy storage and charging system according to the device data. Therefore, the application control module Broker2 can allocate electricity under control of a local distribution center, in which electric energy is input into a large power grid when the electricity is redundant and the electric energy is acquired from the large power grid when the electricity is insufficient; in addition, states of the power grid can be monitored. With a normal power supply from the large power grid, the application server Service2 can store the device data (such as the electric energy), and when the large power grid fails, the application server Service2 can quickly switch to energy storage facilities, thus reducing impacts of power grid failures on life.

Further, as shown in FIG. 2, an MQTT-based distribution Internet of Things system can be created with the above described first, second and third preferred embodiments.

Further, in the above embodiments, the communication module Bridge, the application control module Broker2 and the application control module Broker2 adopt an Message Queuing Telemetry Transmission Protocol (MQTT Protocol), so as to provide stability and a low delay of a device data transmission of the distribution devices in the distribution Internet of Things system.

Further, in the above embodiments, the application control module Broker2 and the application control module Broker2 both adopt an MQTT Bridge component.

The MQTT Bridge component includes any one of a Mosquitto, an Apache-Apollo and an EMQ.

Furthermore, in the above embodiments, both the application control module Broker2 and the sensing control module Broker1 adopt an EMQ.

It should be noted that the EMQ is designed based on a Erlang/OTP language platform with high concurrency, supporting millions of connections and distributed clusters and a Publish/Subscribe model (Pub/Sub), completely supporting MQTT V3.1/V3.1.1/V5.0 protocol specification, and extendedly supporting WebSocket, Stomp, CoAP, MQTT-SN or a private TCP protocol.

It is characterized by:
1) an Apache Version 2.0 based open-source protocol;
2) a peak load of 1 million concurrent MQTT connections on a single node;
3) a complete MQTT protocol support;
4) a QoS 0/1/2 message support;
5) a cross-platform deployment on Linux, FreeBSD, Mac OS X, Raspberry Pi or Windows servers;
6) distributed clusters, two-node load balancing or multi-node distributed cluster; and
7) extension modules and plug-ins, including LDAP, MySQL, PostgreSQL, Redis, MongoDB and other extension plug-ins.

Further, in the above embodiment, the communication module Bridge adopts a bridge (Bridge).

It should be noted that the bridge (Bridge) is located between the application control module Broker2 (adopting the MQTT Bridge component) of the application ring 2 and the sensing control module Broker1 (adopting the MQTT Bridge component) of the at least one sensing ring 1 to realize a bridging function. When a bridging function is implemented by the bridge (Bridge), the device data acquired by the MQTT Bridge component of the perception ring 1 can be subscribed synchronously onto the MQTT Bridge component of the application ring 2, and vice versa.

A management method of an MQTT-based distribution Internet of Things applied to any of the above MQTT-based distribution Internet of Things system is provided. Specifically, the method includes the following.

An application server Service2 (Service21, Service22, Service23, . . . ) issues an application request to an application control module; the application control module sends the application request to a sensing control module Broker1 in a corresponding sensing ring 1 through a communication module Bridge; a corresponding data acquisition and monitoring device Service1 (Service11, Service12, Service13, . . . ) acquires the application request from the sensing control module Broker1; the corresponding data acquisition and monitoring device Service1 controls and acquires device data in the distribution network according to request information in the application request; and the corresponding data acquisition and monitoring device Service1 sends the acquired device data to the application server Service2 through the sensing control module Broker1, the communication module Bridge and the application control module Broker2 successively, so that the application server Service2 performs data management, data processing, data analysis, data monitoring and data pre-warning on the device data.

In the first preferred embodiment, when the distribution network includes an electric vehicle charging station, the distribution devices in the distribution network may include a charger, an emergency charger, a battery maintenance device and a quick replacing device.

The sensing ring 1 includes a data acquisition and monitoring device Service1 corresponding to each of the above distribution devices, namely, a data acquisition and monitoring device Service1 corresponding to the charger, a data acquisition and monitoring device Service1 corresponding to the emergency charger, a data acquisition and monitoring device Service1 corresponding to the battery maintenance device and a data acquisition and monitoring device Service1 corresponding to the quick replacing device.

With the distribution Internet of Things system, a charging transaction log querying, a marketing data analyzing, an accumulated power reading, a charging post state detecting and other applications can be realized.

As a preferred embodiment A, an example is illustrated in which configuration functionality is implemented.

The application ring 2 is provided with an application server Service21 (a configuration server) corresponding to the charger, and the method specifically includes the following steps A1 to A3.

In step A1, the configuration server sends an application request to the application control module Broker2 in a CMD topic, where the application request includes syscfg_w and syscfg information to be configured (where syscfg refers to a system level configuration, which basically will not change after being configured), and the application control module Broker2 transmits the application request to the sensing control module Broker1 through the communication module Bridge;

In step A2, the data acquisition and monitoring device Service11 corresponding to the charger acquire the application request by subscribing to the CMD topic in the sensing control module Broker1 (the MQTT Bridge component) of the sensing ring 1, and controls the charger according to the application request, so as to configure the acquired device data (which can be syscfg) in a DSP topic, and send the device data to the sensing control module Broker1.

In step A3, the sensing control module Broker1 feeds back the device data to the configuration server, and the configuration server Service21 issues a setenv appCfg message (appCfg refers to an application configuration, which varies with charging stations and charging posts) to the application control module Broker2 (the MQTT Bridge component) of the application ring 2 in the CMD topic to configure appCfg, and transmits the configured appCfg to the sensing control module Broker1 (the MQTT Bridge component) of the sensing ring 1, so that the data acquisition and monitoring device Service11 corresponding to the charger can acquire the appCfg configuration data by subscribing to the CMD topic in the sensing control module Broker1 (the MQTT Bridge component) of the sensing ring 1, and update the appCfg configuration data.

As a preferred embodiment B, an example is illustrated in which upgrade functionality is implemented.

The application ring 2 is provided with an application server Service22 (an upgrade server) corresponding to the charger, and the method specifically includes the following steps B1 to B3.

In step B1, the upgrade server sends an application request to the application control module Broker2 in the CMD topic. The application request includes an http_ota upgrade package url, and the application control module Broker2 transmits the application request to the sensing control module Broker1 through the communication module Bridge.

In step B2, the data acquisition and monitoring device Service12 corresponding to the charger acquires the application request (i.e., the above http_ota upgrade package url) by subscribing to the CMD topic in the sensing control module Broker1 (the MQTT Bridge component) of the sensing ring 1, and requests the upgrade server in the distribution network to upgrade the charger according to the application request, so as to obtain the device data of the charger at this time in the DSP topic (the device data is the upgrade data) and send the device data to the sensing control module Broker1.

At step B3, the sensing control module Broker1 feeds back the device data to the upgrade server, and the upgrade server subscribes the device data to the application control module Broker2 (the MQTT Bridge component) of the application ring 2 in the CMD topic to monitor the device data.

As a preferred embodiment C, an example is illustrated in which charge recording functionality is implemented.

The application ring 2 is provided with application servers Service23 (i.e, a callback server and a log server) corresponding to the charger, and the method specifically includes the following steps C1 to C3.

In Step C1, the callback server sends an application request to the application control module Broker2 in a Topic0 topic. The application request includes a charging transaction record message, and the application control module Broker2 transmits the application request to the sensing control module Broker1 through the communication module Bridge.

In step C2, the data acquisition and monitoring device Service13 corresponding to the charger acquires the application request by subscribing to the topic Topic0 in the sensing control module Broker1 (the MQTT Bridge component) of the sensing ring 1, acquires the device data according to the acquired application request, and issues the device data to the sensing control module Broker1 in the topic Topic1.

In step C3, the sensing control module Broker1 feeds back the device data to the log server in the application ring 2, and the log server records the device data.

As a preferred embodiment D, an example is illustrated in which accumulated power reading functionality is implemented.

The application ring 2 is provided with an application server Service24 (i.e., an accumulation reading server and a log server) corresponding to the charger, and the method specifically includes the following steps D1 to D3.

In step D1, the accumulation reading server sends an application request to the application control module Broker2 in the topic Topic0, the application request includes a charging post accumulated power reading message, and the application control module Broker2 transmits the application request to the sensing control module Broker1 through the communication module Bridge.

In step D2, the data acquisition and monitoring device Service14 corresponding to the charger acquires the application request by subscribing to the topic Topic0 in the sensing control module Broker1 (the MQTT Bridge component) of the sensing ring 1, and acquires the device data (the device data at this time includes the accumulated power of the charger) of the charger according to the acquired application request, and issues the device data to the sensing control module Broker1 in the topic Topic1.

In step D3, the sensing control module Broker1 feeds back the device data to the log server in the application ring 2, and the log server records and upgrades the device data.

A management method of an MQTT-based distribution Internet of Things applied to any of the above MQTT-based distribution Internet of Things system is provided. Specifically, the method includes the following.

A data acquisition and monitoring device Service1 sends sensed and acquired device data of a distribution device to a sensing control module Broker1; the sensing control module Broker1 sends the device data to an application control module Broker2 through a communication module Bridge; and the application control module Broker2 sends the device data to a corresponding application server Service2 (Service21, Service22, Service23, . . . ) so that the application server Service2 perform corresponding data management and/or data processing and/or data analysis and/or data monitoring and/or data pre-warning on the device data.

As a preferred embodiment E, an example is illustrated in which log functionality is implemented.

The application ring 2 is provided with an application server Service25 (a log server) corresponding to the charger.

The data acquisition and monitoring device Service15 corresponding to the charger includes a charger acquisition and monitoring device.

A data acquisition and monitoring device Service15 corresponding to a controlling of the charger includes a charger control device.

The method specifically includes the following steps E1 to E3.

In Step E1, the acquisition and monitoring device corresponding to the charger sends sensed and acquired device data of the charger to the sensing control module Broker1, and records the device data as Topic1.

The charger control device sends sensed and acquired device data of the charger control device to the sensing control module Broker1, and records this device data as Topic2.

In Step E2, the acquisition and monitoring device corresponding to the charge and the charger control device upload their own device data to the sensing control module Broker1 respectively, and the sensing control module Broker1 sends the two device data to the application control module Broker2 through the communication module Bridge.

In step E3, the log server in the application ring 2 acquires the device data Topic1 and Topic2 by subscribing to the topics Topic1 and Topic2 in the application control module Broker2, and stores the device data Topic1 and Topic2 according to time information.

The above is only preferred embodiments of the present disclosure, and is not intended to limit implementations and protection scope of the present disclosure. For those skilled in the art, it should be realized that all the schemes obtained by using the equivalent substitutions and obvious changes made in the description and drawings of the present disclosure should be encompassed in a protection scope of the present disclosure.

What is claimed is:

1. A Message Queuing Telemetry Transport (MQTT)-based distribution Internet of Things system, comprising:
    at least one sensing ring comprising a plurality of data acquisition and monitoring devices and a plurality of sensing control modules provided in a distribution network, each data acquisition and monitoring device being connected with one of the plurality of the sensing control modules respectively;
    an application ring comprising a plurality of application servers and an application control module, each application server being connected with the application control module; and
    a communication ring comprising at least one communication module, each communication module being connected with the application control module and the plurality of sensing control modules respectively from the at least one sensing ring; wherein
    the application ring is configured to issue an application request, so that the sensing ring controls a distribution device in the distribution network according to the application request and acquires device data of the distribution device, and the sensing ring feeds the device data back to the application ring, so that the application ring performs data management, data processing, data analysis, data monitoring and data pre-warning on the device data; and
    the sensing ring is configured to sense and acquire the device data of the distribution device, and send the device data to the application ring, so that the application ring performs data management, data processing, data analysis, data monitoring and data pre-warning on the device data;
    wherein the device data comprises operating status data;
    wherein the application control module and the sensing control module both adopt an MQTT Bridge component;

when a bridging function is implemented by one of the Bridge components, the device data acquired by the MQTT Bridge component of the Sensing Ring is subscribed synchronously onto the MQTT Bridge component of the Application Ring, and vice versa.

2. The MQTT-based distribution Internet of Things system according to claim 1, wherein the application control module is provided with a first access interface for accessing the communication module and the sensing ring connected with the communication module; and/or
the communication module is provided with a second access interface for accessing the sensing ring.

3. The MQTT-based distribution Internet of Things system according to claim 1, wherein the distribution network comprises a plurality of distribution device;
the data acquisition and monitoring device is connected with a corresponding distribution device; and
the data acquisition and monitoring device comprises:
a control unit configured to control the distribution device according to the application request;
a sensing acquisition unit configured to sense and acquire the device data of the distribution device; and
a sensing sending unit configured to send the device data to the sensing control module.

4. The MQTT-based distribution Internet of Things system according to claim 1, wherein,
the application server comprises:
a first processing unit configured to process the received operation state data to obtain normal operation data and/or abnormal operation state; and/or
a second processing unit configured to process the received operation state data, and monitor and pre-warn a processing result; and
a third processing unit configured to process the received operation state data and the environmental data, and monitor and pre-warn a processing result.

5. The MQTT-based distribution Internet of Things system according to claim 1, wherein the communication module, the application control module and the application control module adopt a message queuing telemetry transport protocol.

6. The MQTT-based distribution Internet of Things system according to claim 1, wherein
the MQTT Bridge component includes an Erlang/Enterprise/Elastic MQTT Broker (EMQ).

7. The MQTT-based distribution Internet of Things system according to claim 6, wherein the application control module and the application control module both adopt an EMQ.

8. The MQTT-based distribution Internet of Things system according to claim 1, wherein the communication module adopts a bridge.

9. The MQTT-based distribution Internet of Things system according to claim 1, wherein the device data comprises operating status data and environmental data.

10. The MQTT-based distribution Internet of Things system according to claim 1, wherein the system uses a 3C3C architecture.

11. An electric vehicle charging station comprising the MQTT-based distribution Internet of Things system according to claim 1.

12. A photovoltaic power station comprising the MQTT-based distribution Internet of Things system according to claim 1.

13. A management method of an MQTT-based distribution Internet of Things, which applied to the MQTT-based distribution Internet of Things system that comprising:

at least one sensing ring comprising a plurality of data acquisition and monitoring devices and a plurality of sensing control modules provided in a distribution network, each data acquisition and monitoring device being connected with one of the plurality of sensing control modules;
an application ring configured to issue an application request, comprising a plurality of application servers and an application control module, each application server being connected with the application control module;
a communication ring comprising at least one communication module, each communication module being connected with the application control module and a corresponding sensing control module respectively; and
wherein the application control module and the sensing control modules both adopt an MQTT Bridge component;
when a bridging function is implemented by one of the Bridge components, the device data acquired by the MQTT Bridge component of the Sensing Ring is subscribed synchronously onto the MQTT Bridge component of the Application Ring, and vice versa;
wherein the method comprises:
the application server issuing an application request to the application control module; the application control module sending the application request to the plurality of sensing control modules in a respective sensing ring through the communication module;
each data acquisition and monitoring device acquiring the application request from the corresponding sensing control module;
each data acquisition and monitoring device controlling and acquiring device data in the distribution network according to request information in the application request; and
each data acquisition and monitoring device sending the acquired device data respectively to the application server through the sensing control module, the communication module and the application control module successively, so that the application server performs data management, data processing, data analysis, data monitoring and data pre-warning on the device data.

14. A management method of a Message Queuing Telemetry Transport (MQTT)-based distribution Internet of Things, which applied to a MQTT-based distribution Internet of Things system comprising:
at least one sensing ring comprising a plurality of data acquisition and monitoring devices and a sensing control module provided in a distribution network, each data acquisition and monitoring device being connected with the sensing control module;
an application ring configured to issue an application request, comprising a plurality of application servers and an application control module, each application server being connected with the application control module;
a communication ring comprising at least one communication module, each communication module being connected with the application control module and a corresponding sensing control module respectively; and
wherein the application control module and the sensing control module both adopt an MQTT Bridge component;
when a bridging function is implemented by one of the Bridge components, the device data acquired by the MQTT Bridge component of the Sensing Ring is subscribed synchronously onto the MQTT Bridge component of the Application Ring, and vice versa;
wherein the method comprises:
the data acquisition and monitoring device sending sensed and acquired device data of the distribution device to the sensing control module; the sensing control module sending the device data to the application control module through the communication module; and the application control module sending the device data to the corresponding application server, so that the application server perform corresponding data management and data processing and/or data analysis and/or data monitoring and/or data pre-warning on the device data.

* * * * *